Patented June 29, 1943

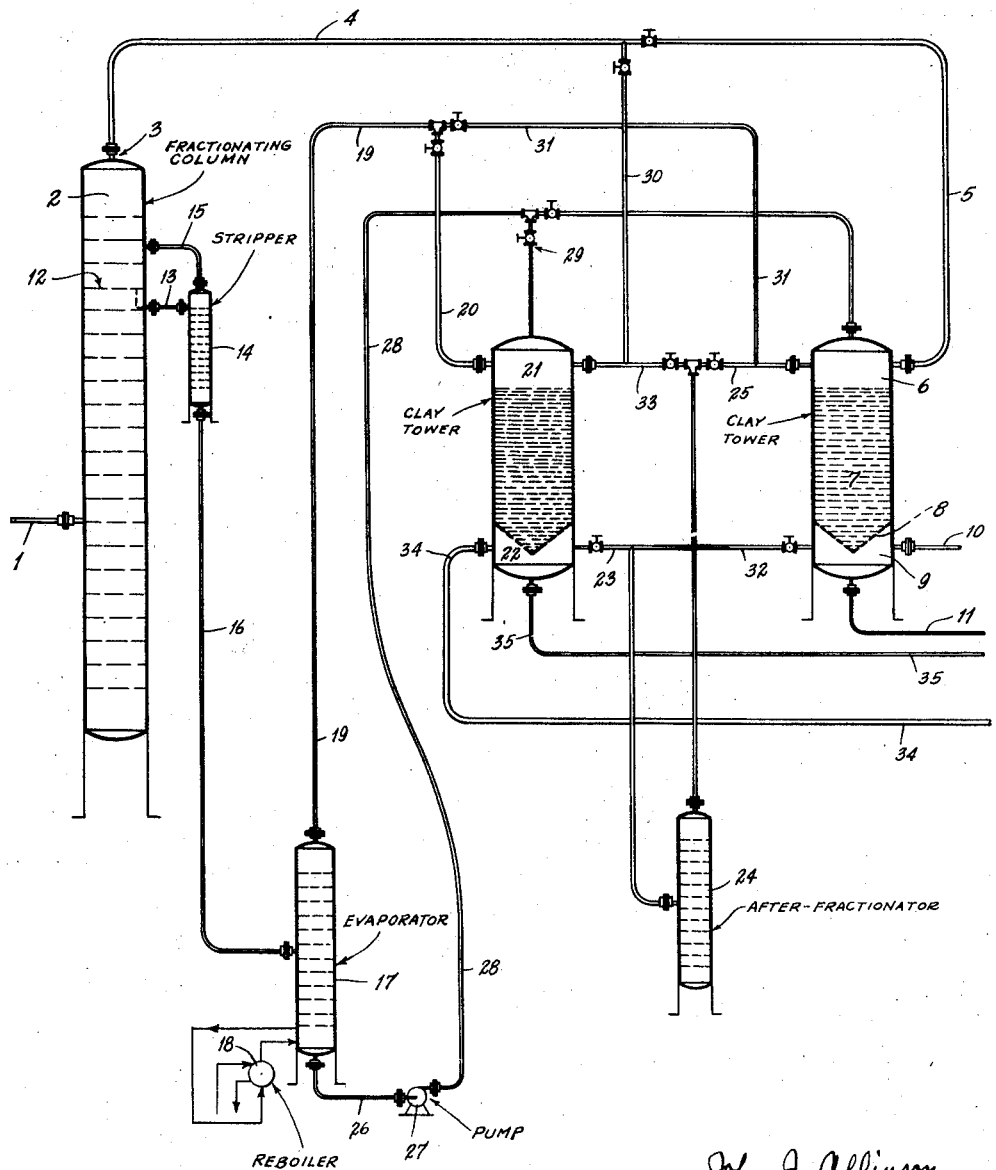

2,323,079

UNITED STATES PATENT OFFICE 2,323,079

METHOD FOR TREATING GASOLINE

John Joseph Allinson, John Ward Poole, and Francis Ralph Grant, El Dorado, Ark., assignors to Lion Oil Refining Company, El Dorado, Ark., a corporation of Delaware Application March 8, 1940, Serial No. 322,934

3 Claims. (Cl. 196—96)

This invention relates to a method for refining petroleum motor fuels; more specifically to an improved method for stabilizing gasoline by removing gum-forming constituents.

One of the principal objects of this invention is the provision of a method for more efficiently removing the gum-forming constituents present, particularly in cracked petroleum distillates. Another object is the provision of an improved method for removing gum-forming constituents from cracked petroleum distillates, including a treatment with catalytic clay in beds, which conserves the clay beds employed for this purpose, and lenghtens the life of such beds. Another object is the provision of a method for more efficiently flushing the polymers formed in the removal process from the clay beds. Other objects will be in part apparent and in part pointed out hereinafter.

The invention accordingly comprises the elements and combinations of elements, steps and sequence of steps, features of construction and manipulation, and arrangements of parts which will be exemplified in the methods hereinafter described, and the scope of the application of which will be indicated in the following claims.

The drawing is a schematic flow diagram of apparatus which may be employed in carrying out the improved method hereinafter described.

The development of the cracking process immensely increased the proportion of gasoline constituents obtained in the refining of crude petroleum oils. It has been found, however, that petroleum distillates prepared by cracking are unstable and tend to form gum upon standing. Accordingly, some method is required for removing the gum so formed prior to sale of the gasoline products, or, alternatively, for the removal of the gum-forming constituents present in the cracked distillates. One of the most efficient methods for removing these gum-forming constituents is by the catalytic polymerization of these unstable compounds by means of a clay bed. The clay bed appears to act, catalytically, to polymerize the unstable constituents which tend to form gum without adversely affecting the remaining constituents of the cracked distillates. The polymers so produced have a boiling point above the gasoline boiling point range, and in consequence become liquid at the temperatures involved, and drain through the clay bed. This bed is generally supported upon a pervious screen or other pervious support, so that the polymers may be drained from the clay bed to prolong its life. Even so, however, the clay bed has heretofore been capable of employment only for a limited number of barrels of gasoline, and has eventually become so contaminated that it has had to be discarded. Methods have been devised for improving the over-all life of the clay bed by countercurrent methods of extraction, but even these have not lengthened the life of the bed to the desired extent. The treatment of the cracked distillate remains an expensive procedure, the cost of which must inevitably be added to the price of the gasoline.

According to the present invention raw cracked gasoline, that is, petroleum distillates containing constituents boiling between approximately 32° F. and 450° F. under atmospheric pressure and which form a commercial gasoline having a boiling range of approximately 100° F. to 400° F., is divided into at least two portions, one of higher boiling point or lower volatility and the other of lower boiling point or higher volatility, which are separately treated. As is hereinafter more particularly described, the life of the clay beds is enormously increased in this way. That is, the number of barrels of gasoline having a commercially satisfactory low gum-forming content which may be produced from a given quantity of clay is tremendously increased. For example, if a cracked gasoline having a boiling range of approximately 100° F. to 400° F. is divided into two fractions, the more volatile having an end point of preferably not more than 250° F., and in any case not substantially greater than 325° F., and the second consisting of the higher boiling material, preferably having a boiling range of approximately 200° F. to 400° F., more than ten times the quantity of the low boiling fraction can be stabilized to less than 5 milligrams of gum by treatment with a given quantity of clay than will be possible if the entire gasoline fraction is treated in undivided condition.

Further, it has been found that a seemingly limitless amount of the heavier fraction can be processed through nearly-spent clay, provided the reduction in gum content is not required to exceed approximately 75%. In fact the life of the clay is substantially unlimited, provided a requirement of not less than 100 milligrams of gum is placed upon the contacted material. Very often this represents a gum reduction considerably in excess of 50%. Such a reduction, although considerable, is of course not sufficient to render the material suitable for incorporation into commercial motor fuels.

Furthermore, it has been found that when the higher boiling fraction has been treated with spent clay of relatively low catalytic power, as indicated above, and the gum content thereby substantially reduced, this partially treated material may be subsequently contacted with substantially fresh clay of relatively great catalytic potency, and the final gum content thereby adjusted to form a commercial material. This final reduction in the gum content of the higher boiling material is more easily accomplished than if the pretreatment is omitted, and it has been found that the polymer materials formed by this second reaction are much less viscous than those produced, both by the pretreatment outlined above and by the present standard method of one step removal of the gum formers. As a result, the polymers formed by the subsequent treatment with fresh clay after the pretreatment with exhausted clay, drain more easily from the clay bed, thereby greatly prolonging the life of the clay.

Summarizing the above, the present invention comprehends the steps of separating the raw cracked distillates into a plurality of fractions, in general two being sufficient, the higher boiling of which fractions is treated with a bed of clay which has previously become sufficiently spent so as to be incapable of producing gasoline of commercial gum specifications, then treating both the higher boiling constituents and the lower boiling constituents with a clay bed which is comparatively fresh, to produce a commercial gasoline, by combining the two fractions. Advantageously, the two fractions may be combined subsequent to the treatment of the higher boiling materials with the spent clay bed, but prior to treatment with the fresh catalytic material, the combined fractions thereafter being passed through the fresh catalytic bed together.

The present invention possesses decided advantages over the customary procedure, wherein the entire gasoline fraction passes successively through a bed or beds of partially spent clay, and finally encounters a bed of comparatively fresh clay, in that the efficient life of the comparatively fresh clay is tremendously prolonged. In addition, it has been found that spent clay can be used, according to the present invention, to polymerize and remove from the higher boiling fraction substantial quantities of undesirable constituents even after it has become sufficiently impregnated with polymers so as to have no substantial commercial effect on an entire gasoline fraction if it was passed therethrough.

An additional method for prolonging the life of the clay employed in the catalytic removal of the gum-forming constituents, according to the present invention, is to inject comparatively high boiling materials in liquid phase to dilute the polymers as formed and assist in removing them from the clay bed. These polymers have previously been flushed from the clay, by using a portion of the gasoline fraction for this purpose. It has been found, however, that petroleum flushing agents of the approximate volatility of kerosene have a greater power to cleanse the catalytic bed, than do petroleum liquids of greater volatility. One embodiment of the present invention employs, therefore, the ends or "butts" issuing from the re-vaporizer shown on the accompanying drawing as the flushing material. Likewise, of course, virgin materials of the kerosene range, such as are produced by the non-destructive distillation of crudes, have great value as flushing and cleansing agents for clay which has become contaminated with viscous polymers from the cracked gasoline.

The accompanying drawing depicts a particularly desirable form of apparatus for carrying out the present improved method. The operation of the invention as portrayed in the drawing is as follows:

Through vapor line 1 vapors from a conventional cracking furnace (not shown) enter fractionating column 2, passing upwardly therethrough. This column is refluxed by any of the conventional means well known to the art. Functioning of this column denudes the vapors issuing from the top thereof, at point 3, of their higher boiling constituents. Reflux columns are conventional and their operation is generally known, so that the operation thereof will not be further discussed. According to one form of the present invention, substantially all of the petroleum substances boiling at about 250° F. or higher are thus separated from the more volatile vapors, which latter pass through conduits 4 and 5, and into clay tower 6, which contains comparatively fresh catalytic clay. From there, the low boiling vapors together with the vapors of the partially refined high boilers, as will be described subsequently, pass downwardly through the clay bed 7, which is supported by a pervious plate or support 8, of any suitable design to permit the clay to be retained thereon, and yet permit passage therethrough of liquids as they arrive at this point. Vapors, and polymers formed within the clay bed are separated in chamber 9 after passing support 8. The vapors issue through conduit 10, which leads to equipment suitable for effecting any subsequent desired processing (not shown). In general, such equipment will comprise an after-fractionator, a condenser and/or an after-cooler. The liquid polymers issuing from chamber 8, pass through conduit 11, and may be disposed of in any suitable manner.

From tray 12 in the fractionating column, liquid petroleum substances having boiling-point characteristics such as are typical of the higher boiling portions of commercial motor fuels, are withdrawn through conduit 13, and stripper 14, which may be of conventional design, and the function of which is to substantially remove remaining portions of low boiling hydrocarbons, such as those which pass from the fractionator through vapor lines 4 and 5 to clay tower 7. These lighter materials pass through conduit 15, back to fractionator 2. The heavier portions, now substantially freed of the lighter boiling constituents, pass from stripper 14 through conduit 16 to evaporator 17. Heat may be supplied to this evaporator 17 by a reboiler 18, utilizing, for example, hot gas oil.

The reboiler 18 may, of course, be heated by any suitable means but cracking plants generally have more heat than can be utilized, so that heating by gas oil is particularly suitable for the practice of this invention. Vapors generated in reboiler 18 pass from evaporator 17, through conduits 19 and 20, to a clay tower 21. This tower is similar in all respects to clay tower 6, except that the clay bed therein has become substantially exhausted through previous use. The vapors continue downwardly through the clay bed into chamber 22, together with such liquids as are formed during the passage. The liquid polymers are withdrawn through conduit 35. From chamber 22, the now-partially refined vapors pass through conduit 23, through after-fractionator 24, and conduit 25, to the top of clay tower 6, where they become commingled with the vapors of the lower boiling constituents entering through conduit 5. The mixture of vapors then passes jointly downwardly through the clay bed, the treated vapors issuing from the system through conduit 10, and the resulting liquid polymers, both of the lower boiling and higher boiling fraction, being withdrawn through conduit 11.

According to the preferred form of the present invention, those portions of the liquid entering evaporator 17 through conduit 16, which remain after the major portion thereof is evaporated, are removed from evaporator 17 through conduit 26, and are forced by pump 27 through conduits 28 and 29 to clay tower 21 where they are dispersed over the upper surface of the clay bed by any suitable means. They then flow downwardly through the clay bed with comparative uniformity, thereby flushing from the clay bed polymers formed therein, which would otherwise be comparatively difficult to remove.

In the foregoing description, clay tower 6 is shown as containing comparatively fresh clay, while clay tower 21 contains clay which has been substantially spent through previous use. After a period of operation, the clay tower 6 becomes sufficiently contaminated with polymers to render it unable to perform its functions in a manner which will produce commercially stable gasoline. When these conditions have been brought about the clay in tower 21 is removed and fresh clay substituted therefor. This may be performed during a shut-down of the cracking unit, or a third tower may be installed as a standby equipment, the lines to all three towers then being so manifolded that flow through them may be controlled in any desired sequence. In the case of two towers only (as shown), the clay must be removed from tower 21 during a shutdown period, and new clay substituted therefor. When the equipment is subsequently placed back in service again, the respective functions of towers 6 and 21 are reversed, the flow thereafter being as follows:

The vapors passing through vapor line 4 will now pass through line 30 instead of line 5, and will enter clay tower 21 which now performs the service formerly performed by tower 6. Similarly, vapors passing through conduit 19 will pass through line 31 instead of conduit 20, and will enter clay tower 6, passing downwardly through the clay bed to chamber 9. The vapors will then pass through conduit 31 through after-fractionator 24, and conduit 33, to clay tower 21, wherein they will commingle with vapors entering through conduit 30, and pass downwardly through the tower and into chamber 22. The combined treated vapors will pass therefrom to conduit 34, and the liquid polymers will be withdrawn at 35.

In general, it is desirable that conduits 10 and 34 and 11 and 35 shall be joined, to make possible the recovery of the treated gasoline, and of the liquid polymers, by use of the same apparatus.

Any of the clays customarily employed for the catalytic polymerization of gum forming constituents in raw cracked gasoline may be used in carrying out the present invention.

In view of the above, it will be seen that the several objects of the invention are achieved and other advantageous results attained.

As many changes could be made in the above methods without departing from the scope of the invention, it is intended that all matter contained in the above description or shown in the accompanying drawing shall be interpreted as illustrative and not in a limiting sense.

What is claimed is:

1. The method of clay-treating cracked gasoline in the vapor phase, which comprises dividing the raw cracked gasoline into a fraction of relatively high volatility, and a fraction of relatively low volatility, passing the vapors of said fraction of relatively low volatility through at least one bed of clay, the catalytic power of which is substantially expended, and through at least one bed of clay of relatively great catalytic potency, passing the vapors of said fraction of relatively high volatility only through at least one bed of clay of relatively great catalytic potency, removing polymers from all of said beds of clay, and recovering the combined vapors of both fractions as a single product.

2. The method of treating cracked gasoline in the vapor phase, which comprises passing the vapors evolved from petroleum fractions which have been subjected to cracking conditions, through a fractionating means, therein fractionating said vapors into a highly volatile gasoline fraction, the end point of which does not substantially exceed 325° F., and into a fraction of comparatively low volatility containing substantially all of the remaining petroleum substances suitable for inclusion in gasoline, and also into other fractions; removing said fraction of comparatively low volatility, reevaporating the major portion thereof, passing the resulting vapors successively through at least one bed of clay, the catalytic power of which is substantially expended, and then through at least one bed of clay of relatively great catalytic potency; passing said highly volatile gasoline fraction in vapor phase through only at least one bed of clay of relatively great catalytic potency; removing polymers from all of said beds of clay, and recovering the combined vapors of both fractions as a single product.

3. The method of treating cracked gasoline in the vapor phase, which comprises passing the vapors evolved from petroleum fractions which have been subjected to cracking conditions, through a fractionating medium, therein fractionating said vapors into a highly volatile gasoline fraction, the end point of which does not substantially exceed 325° F., and into a fraction of comparatively low volatility containing substantially all of the remaining petroleum substances suitable for inclusion in gasoline, and also into other fractions; removing said fraction of comparatively low volatility, re-evaporating the major portion thereof, passing the resulting vapors successively through at least one bed of clay, the catalytic power of which is substantially expended, and then through at least one bed of clay of relatively great catalytic potency; passing said highly volatile gasoline fraction in vapor phase through only at least one bed of clay of relatively great catalytic potency; flushing at least one of the beds of clay, the catalytic power of which is substantially expended, with a petroleum substance less volatile than gasoline, removing polymers from all of said beds of clay, and recovering the combined vapors of both fractions as a single product.

4. The method of treating a petroleum cut in the gasoline range which cut contains gum forming constituents, which comprises separating said cut into two fractions of different volatility, passing the fraction of relatively lower volatility in vapor phase through at least one bed of clay, the catalytic power of which is substantially expended, and through at least one bed of clay of relatively great catalytic potency, passing the fraction of relatively higher volatility in vapor phase only through at least one bed of clay of relatively great catalytic potency, removing polymers from all of said beds of clay and recovering the vapors of both fractions as a single product.

5. The method of treating a petroleum cut in the gasoline range which cut contains gum forming constituents, which comprises separating said cut into two fractions of different volatility, passing the fraction of relatively lower volatility in vapor phase through a bed of clay the catalytic power of which is substantially expended and through a bed of clay of relatively great catalytic potency, and passing the fraction of relatively higher volatility only through said bed of relatively great catalytic potency.

6. The method of treating a petroleum cut in the gasoline range which cut contains gum forming constituents, which comprises separating said cut into two fractions of different volatility, passing the fraction of relatively lower volatility in vapor phase through a bed of clay of relatively low catalytic power and through a bed of clay of relatively great catalytic potency, and passing the fraction of relatively higher volatility only through said bed of relatively great catalytic potency.

7. The method of treating a petroleum cut in the gasoline range which cut contains gum forming constituents, which comprises separating said cut into two fractions of different volatility, passing the fraction of relatively lower volatility in vapor phase through a bed of clay of relatively low catalytic power and through a bed of clay of relatively great catalytic potency, and passing the fraction of relatively higher volatility only through a bed of relatively great catalytic potency.

8. The method of treating a petroleum cut in the gasoline range, which cut contains gum-forming constituents, which comprises separating said cut into at least two fractions of different volatility, passing a fraction of relatively lower volatility in vapor phase through a bed of clay of relatively low catalytic power and through a bed of clay of relatively great catalytic potency, and passing a fraction of relatively higher volatility only through a bed of relatively great catalytic potency.

JOHN JOSEPH ALLINSON.
JOHN WARD POOLE.
FRANCIS RALPH GRANT.